Aug. 20, 1968 T. L. LARSEN ET AL 3,398,310

INDIRECT ENERGY BAND GAP TOPOLOGY INJECTION ELECTROLUMINESCENCE SOURCE

Filed March 11, 1965 2 Sheets-Sheet 1

INVENTORS
TED L. LARSEN
ROBERT J. ARCHER
EGON E. LOEBNER

BY R. C. Smith

ATTORNEY

Aug. 20, 1968 T. L. LARSEN ET AL 3,398,310

INDIRECT ENERGY BAND GAP TOPOLOGY INJECTION ELECTROLUMINESCENCE SOURCE

Filed March 11, 1965 2 Sheets-Sheet 2

INVENTORS
TED L. LARSEN
ROBERT J. ARCHER
EGON E. LOEBNER

BY A. C. Smith

ATTORNEY 3,398,310

INDIRECT ENERGY BAND GAP TOPOLOGY INJECTION ELECTROLUMINESCENCE SOURCE

Ted L. Larsen, Stanford, Robert J. Archer, Portola Valley, and Egon E. Loebner, Palo Alto, Calif., assignors to Hewlett-Packard Company, Palo Alto, Calif., a corporation of California Filed Mar. 11, 1965, Ser. No. 438,949
7 Claims. (Cl. 313—108)

ABSTRACT OF THE DISCLOSURE

A P–N junction is formed in an alloy having an indirect energy band gap topology to provide injection electroluminescence having a greater luminosity efficiency at 300° K. than is provided by any composition of the same alloy having a direct energy band gap topology.

This invention relates to an injection electroluminescent material that provides visible electroluminescence for use in a solid state display device.

Injection electroluminescence of the near edge emission band is of a very high quantum efficiency in gallium arsenide, a direct band gap semiconductor material; however, it is of exceedingly low luminosity. Near edge electroluminescence is herein defined to include that emission resulting from radiative recombinations of electrons and holes across the semiconductor band gap as well as those originating and/or terminating on shallow defect states. In gallium phosphide, an indirect band gap semiconductor material, injection electroluminescence of the near edge emission band is near optimum luminosity insofar as the response of the human eye is concerned, but it is of very low quantum efficiency.

Accordingly, it is an object of this invention to select the optimum composition range in the gallium arsenide phosphide alloy system for providing highly efficient injection electroluminescence of high luminosity to the human eye.

It is another object of this invention to provide an injection electroluminescent material which efficiently generates light that is highly visible to the human eye.

Figure 1:
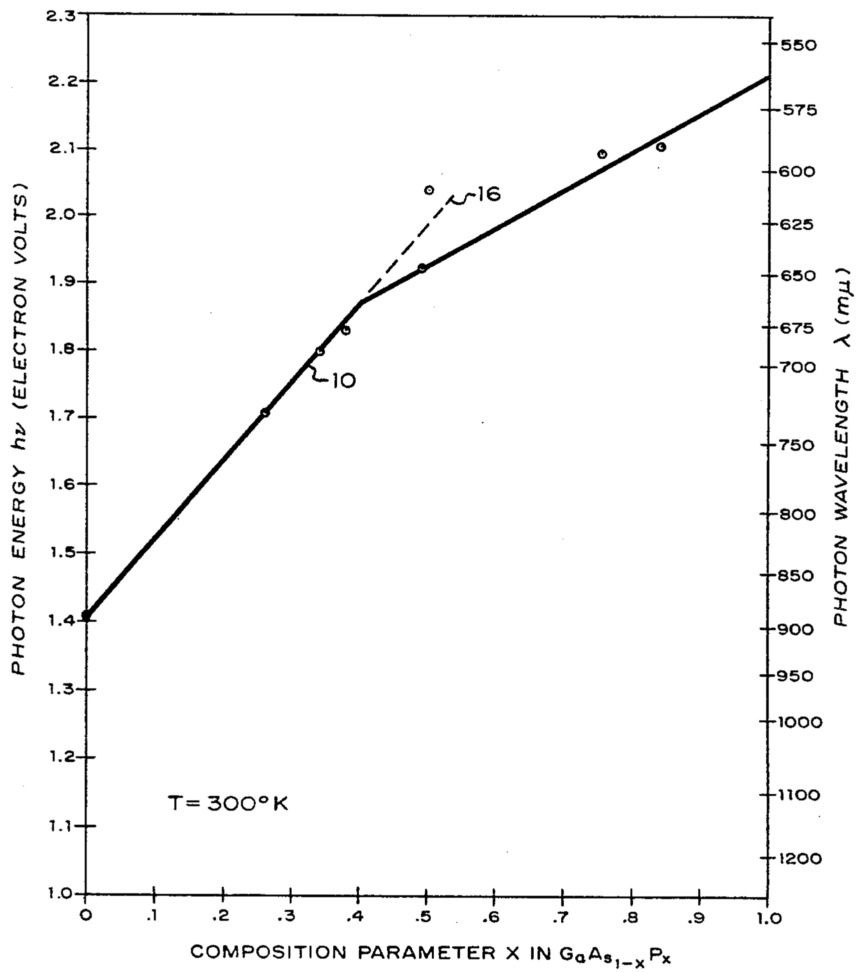
Figure 2:
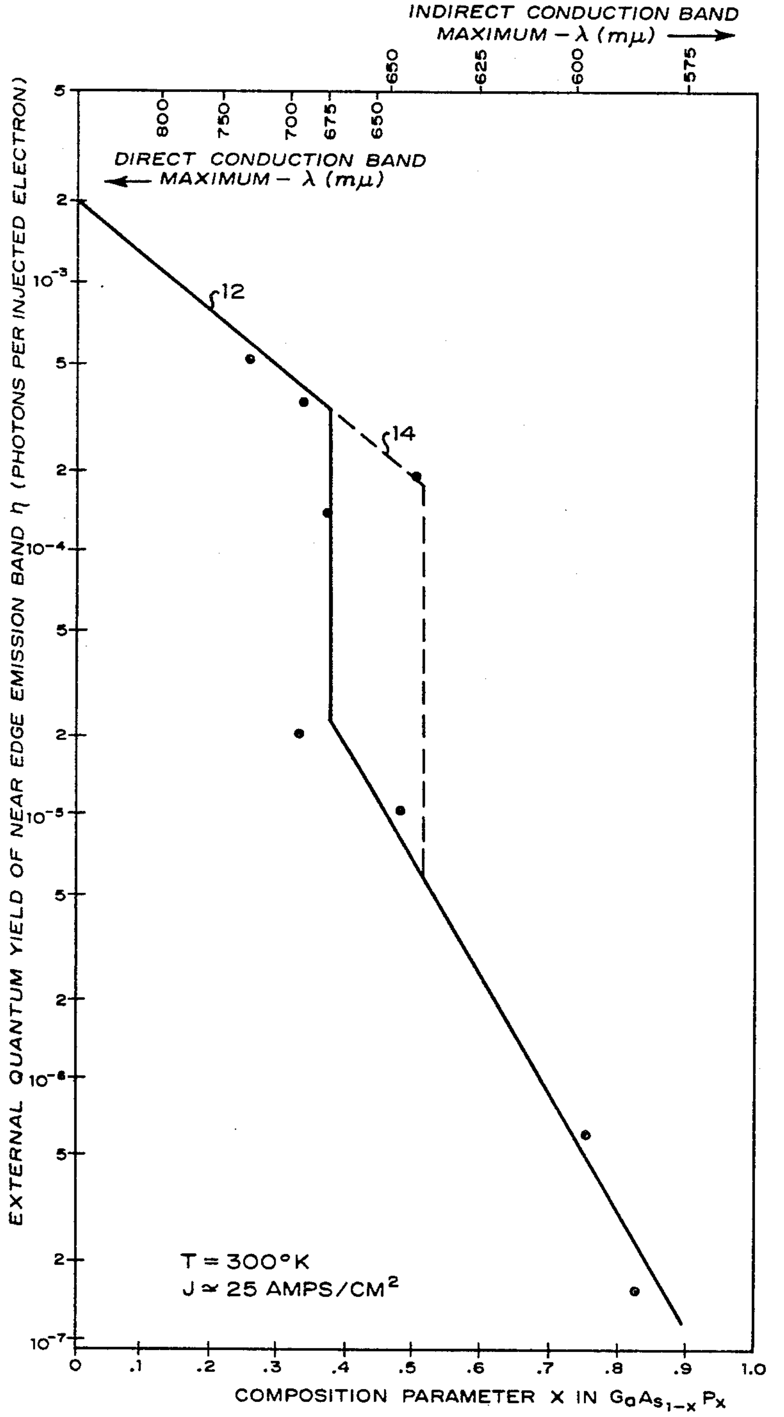

In the drawing, FIGURE 1 is a plot showing the dependence of the photon energies $h\nu$ or the equivalent photon wavelengths $\lambda$ of the peak of the near edge emission band electroluminescence on the crystal composition parameter $x$ in zinc diffused diodes of the gallium arsenide phosphide semiconductor alloy system ($GaAs_{1-x}P_x$) at 300° K. (room temperature); and FIGURE 2 is a plot showing the dependence of the external quantum yield $\eta$ of the near edge emission band on the crystal composition parameter $x$ of the gallium arsenide phosphide diodes of FIGURE 1 at 300° K. and with an approximate current density J of twenty-five amperes per square centimeter. The external quantum yield $\eta$ is herein defined as the number of photons emitted from the diode in a solid angle of approximately $2\pi$ stereradians per injected electron through the diode. On the basis of our experience with similar gallium arsenide structures which have been investigated in detail we estimate the internal quantum efficiency to be about two-hundred to three-hundred times the external quantum efficiency and therefore equal to about four to six percent.

Referring to FIGURE 1, the discontinuity in the slope of the solid line 10 at about $x=0.4$ corresponds to the transition from a direct to an indirect band gap semiconductor material with increasing values of the composition parameter $x$ as determined by photon absorption and photoelectron emission. See W. G. Spitzer and C. A. Mead, Phys. Rev. 137, A 1628 (1964). By a direct band gap semiconductor material we mean a semiconductor or insulator with an energy band gap topology such that the uppermost energy maximum or maxima in the valence band and the lowest energy minimum or minima in the conduction band appear at the same points in $$\vec{k}$$

or momentum space. Any other case represents an indirect material which requires the coincidence of an event such as phonon emission or absorption to accompany the photon generation process when carriers such as holes and electrons of unequal momenta recombine across the energy band gap.

In an indirect band gap semiconductor material the radiative recombination lifetime is many orders of magnitude longer than in a direct band gap semiconductor material. Indirect band gap semiconductor materials are therefore much more vulnerable to competition from other recombination process such as nonradiative or long wavelength radiative recombinations through impurity or defect states. Thus, crystals of much greater purity and perfection are required to provide external quantum yields $\eta$ in indirect band gap semiconductor materials of equal efficiency with those provided in direct band gap semiconductor materials.

Referring to FIGURE 2, a defect containing gallium arsenide phosphide semiconductor alloy system is represented by the solid line 12. The highly efficient photon emission associated with the $$\vec{k}=0$$

conduction band minimum of gallium arsenide in known to be a characteristic of this semiconductor alloy system up to about $x=0.4$ as indicated by the first portion of the solid line 12. As the state of the art advances and it becomes possible to produce crystals having fewer impurities and microstructure defects as well as more accurately controlled dopant densities, it is likely that this first portion of the solid line 12 will be flat instead of having its present slope. At about $x=0.4$, corresponding to a photon energy $h\nu$ or about 1.87 electron volts and a wavelength $\lambda$ of about 670 millimicrons, the photon emission efficiency $\eta$ significantly decreases as the recombination mechanism associated with the direct conduction band minimum changes to that associated with the indirect conduction band minima. This is indicated by the vertical portion of the solid line 12. The response of the human eye to light of this wavelength is only 3.2 percent of its photopic maximum at about 555 millimicrons and 0.015 percent of its scotopic maximum at about 505 millimicrons.

We have discovered that in a gallium arsenide phosphide alloy which is relatively more perfect, efficient operation (i.e., high external quantum yield $\eta$) may be achieved even in indirect materials as long as the direct conduction band minimum of the alloy is less than four times the thermal energy of the carriers above the indirect minima. At 300° K. this energy is approximately equal to 0.1 electron volt. We have interpreted this experimentally observed dependence to mean that the direct recombination process with its shorter radiative recombination lifetime will successfully compete against both the indirect recombination process with its more plentiful electrons, but longer radiative recombination lifetime, and the recombination process through a relatively small number of defect and impurity states. An upper limit on the ratio of the recombination lifetime of the direct conduction band minimum to the recombination lifetime of the indirect conduction band minima, $\tau_D/\tau_{ID}$, is about $10^{-3}$.

The gallium arsenide phosphide semiconductor alloy system may therefore provide highly efficient photon emission at room temperature up to about $x=0.51$ for crystals relatively free of defects and impurities as indicated by the broken line 14 in FIGURE 2. A corresponding increase in photon energy is indicated by the broken line 16 in FIGURE 1 such that for $x=0.51$ light having a photon energy of about 2.04 electron volts and a wavelength of about 610 millimicrons is emitted. The response of the human eye for light of this wavelength is 50.3% of its photopic maximum value and 1.6% of its scotopic maximum value. This is an improvement of one or more orders of magnitude in luminosity. Thus, in accordance with this invention, there is provided a highly efficient electroluminescent material at room temperature comprising, for example, $GaAs_{1-x}P_x$ in which the indirect conduction band minima are not more than $4kT$ lower than the direct conduction band minima and in which the composition parameter $x$ has a value ranging from about 0.40 to 0.55.

We claim:

1. An injection electroluminescent device comprising a P-N junction formed in an electroluminescent alloy system that has a direct energy band gap topology for a first range of compositions and an indirect energy band gap topolgy for a second range of compositions, said alloy system having a composition in the second range and having a purity and crystalline perfection for which this composition of the alloy system sustains direct recombination of minority carriers at an external quantum yield level of at least $10^{-4}$ photons per injected carrier when the P-N junction is forward biased at 300° K.

2. An injection electroluminescent device as in claim 1 wherein said alloy system comprises $GaAs_{1-x}P_x$ having a composition in the range of $x=0.41$ to 0.55.

3. An injection electroluminescent device as in claim 2 wherein said alloy system has a composition in the range $x=0.45$ to 0.55.

4. An injection electroluminescent device as in claim 3 wherein said alloy system has a composition in the range $x=0.50$ to 0.55.

5. An injection electroluminescent device as in claim 2 wherein the direct conduction band minimum has an energy level less than $6kT$ above that of an indirect conduction band minimum.

6. An injection electroluminescent device as in claim 5 wherein the direct conduction band minimum has an energy level less than $4kT$ above that of the indirect conduction band minimum.

7. An injection electroluminescent device as in claim 5 wherein the ratio of the recombination lifetime of minority carriers from the direct conduction band minimum to the recombination lifetime of minority carriers from the direct conduction band minimum is less than one.

References Cited

UNITED STATES PATENTS 3,302,051 1/1967 Galginaitis ---------- 313—108

OTHER REFERENCES

Cusano et al., Recombination Scheme and Intrinsic Gap Variation in $GaAs_{1-x}P_x$ Semiconductors From Electron Beam and p-n Diode Excitation, App'd. Phys. Letters, vol. 5, No. 7. January 10, 1964.

JAMES W. LAWRENCE *Primary Examiner.*

R. L. JUDD, *Assistant Examiner.*

UNITED STATES PATENT OFFICE

CERTIFICATE OF CORRECTION

Patent No. 3,398,310 August 20, 1968

Ted L. Larsen et al.

It is certified that error appears in the above identified patent and that said Letters Patent are hereby corrected as shown below:

Column 2, line 19, for "process" read -- processes --; line 34, for "in" read -- is --; column 4, line 21, for "direct" read -- indirect --.

Signed and sealed this 15th day of July 1969.

(SEAL)
Attest:

Edward M. Fletcher, Jr.
Attesting Officer

WILLIAM E. SCHUYLER, JR.
Commissioner of Patents